United States Patent Office 3,102,822
Patented Sept. 3, 1963

3,102,822
COMPOSITIONS FOR FORMING FILMS WITH HYDROPHOBIC PIGMENT AND METHOD
Theodore A. Te Grotenhuis, Olmsted Falls, Ohio (524 Bulkley Bldg., Cleveland 15, Ohio)
No Drawing. Original application June 2, 1958, Ser. No. 738,986. Divided and this application Nov. 20, 1961, Ser. No. 153,685
3 Claims. (Cl. 106—238)

The present application is a division of my application Serial No. 738,986, filed June 2, 1958, now U.S. Patent 3,023,181, which in turn is a continuation-in-part of application, Serial No. 724,233, filed March 27, 1958, now abandoned.

The present invention relates to pigmented coating compositions such as printing or lithographic inks, paints, lacquers, etc. and to a method of preparing the same. It particularly relates to a method of improving the film formed from pigmented aqueous dispersions of film-forming high polymers or resins.

It is an object of the present invention to provide a coating composition having an aqueous continuous phase in which the cohesion between the pigment and the vehicle or the wetting of the pigment particles by the vehicle is enhanced.

It is another object of the present invention to provide a pigmented coating composition comprising an aqueous emulsion or dispersion of any suitable organic vehicle in which pigment particles have, in the resultant film, an organophilic surface, i.e., one more readily wetted by said organic vehicle than by water, so that a superior union of pigment and film-forming globules is obtained and so that the film becomes more resistant to humidity.

It is a further object of the present invention to provide a film-forming coating composition or ink containing a pigment with a surface treatment which facilitates formation of a non-porous film from pigmented aqueous dispersions.

It is a still further object to provide a pigmented coating deposited from an aqueous emulsion or dispersion of organic film-forming material which is less porous and has superior moisture resistance.

In accordance with the present invention, I attain the above and other objects by incorporating in aqueous emulsions of a film-forming resin or rubber (high polymer) or in a dispersion or in film deposited from such emulsion or dispersion one or more inorganic pigments which have been treated by a fluid which renders surface portions of said pigment hydrophobic or organophilic so that it loses its tendency to be wet by water. The treating fluid comprises silicon or complex-forming metal capable of holding a hydrocarbon or halogenated hydrocarbon group to inorganic surfaces. Specifically, water-soluble complexes formed of an organic carboxylic acid with a chromium salt and also organosilicone compounds as herein described are most suitable in treatment of the pigments.

By treating pigments, I not only provide groups adhered to the surface of pigment particles to facilitate dispersion of the pigment in the organic vehicle, but I make the pigment more readily wetted by the organic vehicle.

The advantage of utilizing a pigmented aqueous emulsion of natural or synthetic resins or an emulsion of a solution of such resins has long been apparent to manufacturers of inks and coating compositions. In such compositions the hydrophilic pigments are in the aqueous phase and, not being readily wettable by many organic materials, tend to prevent full union of the separate globules of resin during drying, with the result that the films are frequently much more porous than desired.

With pigments treated in accordance with the present invention any treated pigment outside the globules of organic resin solutions in the drying film tends to cause the globules to coalesce and, therefore, facilitates formation of a more impervious film.

In accordance with one aspect of the present invention, which is particularly important in the case of coating compositions comprising an aqueous emulsion or dispersion of a resin or high polymer that is to be fused or heated at elevated temperature after drying of the film or deposit on the article or surface on which the coating compositions are applied, advantages of pigments previously treated to render them hydrophobic can be obtained without a separate previous treatment of the pigment by reactive organosilicone. This is accomplished by incorporating into the emulsion or aqueous dispersion of fusible film-forming material a water-soluble reactive fluid pigment-treating composition which reacts with the pigment surface at least at elevated temperatures such for example as those at which the coated article or the coating thereon can be subjected during the fusing operation.

Thus, I have found that I can incorporate into an aqueous dispersion of a film-forming solid, particularly of one or more fusible film-forming resins or other fusible or heat treatable solid high polymers, a suitable water-soluble Werner complexing compound, as hereinafter described, which reacts with the inorganic surface of the pigment to render the surface portions hydrophobic upon heating. The chemical reaction may of course be by coordination complex formation with the pigment surface or by formation of a covalent bond with hydroxyl groups on the pigment surface. Thus, the water-soluble pigment-treating materials apparently concentrate about the pigment surface upon the evaporation of water from the coating. Inasmuch as the inorganic pigment is preferentially wet by water, the pigment seems to be the last to give up water and hence the solution of water-soluble pigment-treating material becomes concentrated about the pigment where it is needed to react with the pigment during the fusion period. When the coated surface containing the dried deposit is subjected to elevated temperature to fuse the binder, the reaction between the pigment-treating material and the pigment surface occurs with the result that surface portions of the pigment become hydrophobic and therefore much more susceptible to wetting by the fused organic binder. Inasmuch as the pigment becomes hydrophobic, the resistance of the final pigmented film to water is enhanced. This is particularly important in metal primers used under enamels, etc.

According to this aspect of the present invention, the pigment-treating material is preferably incorporated into the aqueous dispersion of film-forming material. It should have substantial water-solubility.

Treating materials capable of rendering the pigment particles hydrophobic are the Werner chromium complexes described in one or more of the Ralph K. Iller United States Patents 2,273,040, 2,356,161 and 2,524,803, and in the Remus F. Caroselli United States Patent 2,744,835, and similar compounds wherein a monocarboxylic organic acid, having a hydrocarbon group of at least two carbons connected to a carboxyl group, is complexed with a coordinating metal such as chromium. Acids having a hydrocarbon group of two or more carbon atoms include the aliphatic, monocarboxylic acids of both the saturated and unsaturated types of which acrylic acid, decanoic acid, lauric acid and oleic acid are examples, the alicyclic acids such as cyclohexyl carboxylic acid, the arylcarboxylic acids such as naphthenic acid, benzoic acid, etc., as well as complex acids such as rosin acid or abietic acid.

The Werner chromium complex, which may be prepared as described in one or more of the above patents by substituting the desired acid for that there used, should preferably be mixed with the water used in preparing the pigment slurry so that some adsorption of the complex on the pigment surface may occur prior to incorporation of the pigment with the emulsion of film-forming material.

The amount of water-soluble treating material should generally be at least .5% of the weight of the pigment to obtain appreciable improvement in the film. The optimum amount depends of course upon the surface area of the pigments used. Not all of the surface area need be covered to obtain a great portion of the benefits. However, a further improvement may be noted as the amount of surface area covered is increased. Thus, superior results are obtained when the amount of the pigment-treating fluid is increased and 1 or 2%, up to 10 or 15% are usual. Larger amounts than 15 or 20% are not generally desirable because of the high cost of the pigment-treating material relative to the cost of the pigment. Generally about 3 to 10% or so of the weight of the pigment is preferred.

The preferred organic groups adhered to the pigment are hydrocarbon groups, either aromatic, aliphatic or araliphatic. Aliphatic groups of more than one carbon atom exert greater effect per mole on selective wetting by hydrocarbon vehicles than does the methyl group, probably because of their greater covering power. For polymerizable or vulcanizable vehicles such as rubber, or monomers or partial polymers polymerizable to the vulcanizable rubbery state, one or more organic groups containing unsaturated aliphatic carbon-to-carbon linkages are preferred, hydrocarbon groups being preferred for hydrocarbon polymerizable materials, etc.

Halogenated organic groups, unsaturated groups and/or ether groups attached to the pigment are also desirable for pigment grinding or where the pigment is to be used in aqueous vehicles since such groups are somewhat more hydrophilic than saturated hydrocarbon groups.

*Example I*

A latex of a graft polymer is prepared along the lines described in my prior United States Patent 2,745,818 by polymerizing about 70 parts of butadiene, 30 parts of styrene, 5 parts of sodium stearate, .1 part of MTM mercaptan (mixed tertiary mercaptans), .3 part of potassium persulfate and 180 parts of water in an autoclave at about 50° C. until the conversion of the polymer reached about 95 or 96%, whereupon 40 parts of mono-olefinic compound, such as methyl methacrylate or a mixture of equal parts of methyl methacrylate and acrylonitrile, are incorporated into the reactor along with .08 part of additional potassium persulfate, and the polymerization continued with agitation until conversion is substantially 100%. The latex thus formed, upon drying, has little coherence to a base material upon which it is spread until the base material containing the coating is fused at elevated temperatures of about 250° F. to 300° F.

Into the 150 parts of the latex above prepared is incorporated a mill base or aqueous pigment dispersion prepared as follows: about 30 parts of red iron oxide, 12 parts of lithopone and 12 parts of titanium dioxide are dispersed in about 25 parts by weight of water containing about .25 part of Daxad (condensation product of naphthalene sulfonic acid and formaldehyde), .35 part of carboxy methyl cellulose, .1 part of sodium lauryl sulfate, and about .5 parts of vinyl triethoxysilane (hydrolyzed solution made as shown in the Gottfurcht U.S. Patent No. 2,763,629, aforementioned). The mill base is milled on a three-roll mill until a good dispersion of pigment is produced.

The pigmented latex thus produced is sprayed onto a steel panel which had been previously treated to provide a coating thereon of amorphous phosphate and the coating allowed to dry. After drying, the coating is heated with infrared sufficiently to cause fushion of the resinous binder and formation of an exceedingly coherent film. The film has excellent water resistance and is especially desirable as a primer for alkyd resin enamel top coatings.

During the drying of the film, the aqueous solution of ethoxysilane is apparently concentrated about pigment particles and during the fusion, reaction between the pigment and the silicone occurs with resultant bonding of the vinyl groups to the pigment surface through the silicon atoms.

*Example II*

The mill base in Example I is substituted by a mill base or aqueous dispersion prepared as follows: About 30 parts of iron oxide, 12 parts of lithopone and 12 parts of titanium dioxide are dispersed in about 125 parts by weight of water containing about 4 parts by weight of stearate chromium chloride, as described in United States Patent 2,744,835, and preferably plus a suitable protective colloid, such as carboxymethyl cellulose, gelatin, etc. in amounts of about .5 part and, optionally, a small amount such as 0.5 to 3% of the weight of the pigment of a suitable wetting agent, such as sorbitan mono-oleate, sodium lauryl sulfate, aryl alkyl sodium sulfate, or other oil-in-water emulsifying agent as listed in Appendix 2 of Introduction to Emulsions by Sutheim, published in 1946 by Chemical Publishing Co., Inc., of Brooklyn, New York.

The mill base is milled on a three-roll mill, as in Example I until a good distribution of pigment is produced and then incorporated into the aqueous dispersion of film-forming material of Example I in place of the mill base of that example.

The pigmented latex thus produced is painted onto a suitable base, such as a steel panel, which has preferably been phosphatized, and after drying, the coating on the panel is heated to about 300° F. to cause fusion of the resinous binder and formation of a pigmented film which adheres to the panel. The film thus formed has substantially decreased water-absorption and has improved gloss over films of similar pigment content but deposited from aqueous dispersion, which do not contain the hydrophobic pigment or the pigment-treating material.

The Werner chromium complex in the above example may be substituted by other Werner chromium complex compounds having hydrocarbon or chlorinated hydrocarbon groups of at least two carbon atoms connected through carboxyl to the chromium.

It is not essential that chromium complex be unsaturated in the products of the present invention unless a chemical bond to the pigment surface is desired. In polymers having residual unsaturation some chemical bonding can probably occur through the action of ultraviolet light and certain radiation to which the film is subjected in use.

The pigments of the above example may be substituted by other inorganic pigments and other mixtures of pigments, including barytes, zinc oxide, "Hi-Sil," aluminum oxide, lead oxide, lead carbonate, lead chromate, etc. or any inorganic pigment, as is well-known in the art, to obtain various properties. Red iron oxide is particularly desirable for primers. When the coating over the primer is deposited from aqueous emulsion, further improvement is also had by incorporating the reactive silicon compound in the emulsion or dispersion of that coating composition.

The resin may be substituted by other resins which may be fused or which are subject to heat treatment to cause reaction of the silicone treating agent on the surface of the inorganic oxide pigment.

Examples of other resinous materials include polyvinyl halides, particularly polyvinyl chloride, polyvinyl acetate, copolymers of vinyl chloride and vinyl acetate, polystyrene, methyl methacrylate, copolymers of methyl methacrylate and other acrylates, copolymers of styrene with 2-ethyl hexyl acrylate and methacrylic acid and/or acrylonitrile, etc., as desired. Grafit polymers of a mono-olefine on rubbery polymers and copolymers of diolefinic compounds (including polymers of butadiene, chloroprene, isoprene and dimethyl butadiene, and copolymers of such with one or more of styrene, acrylonitrile, etc.) are particularly desirable for coating on metal.

The film deposited from aqueous solution after heat treatment contains pigment which has hydrophobic surface portions to substantially improve the impermeability of the film to water and to substantially improve the adhesion of pigment to binding material.

The chromium complex compounds or the water-soluble silicones can be substituted in whole or in part by thio-isocyanates of the formula RNCS, where "R" is an alkyl group of three to twenty carbon atoms, alkylenyl groups of three to twenty carbon atoms, or an aryl group such as phenyl. The dithio-isocyanates having two thio-isocyanate groups and having six or more carbon atoms also have some beneficial effect in increasing hydrophobicity of the pigments. The thio-isocyanate compound is preferably mixed with the pigment during the formation of the slurry and before addition to the emulsion of binding material.

In the claims, the terms "aqueous dispersion of film-forming materials" and "aqueous dispersion of film-forming polymer" are used to designate a continuous aqueous phase in the composition as applied to the surface of the metal. The term "polymer" is used in its generic sense to include copolymers.

As used in the claims, the terms "polymers of ethylenically unsaturated monomers" is used in the generic sense to include homopolymers, copolymers and interpolymers of one or more olefinic compounds and includes the hydrocarbon resins, coumarone indene resins, etc. which may be obtained from monomers not presegregated from impurities, as well as polymers and copolymers from pure or purposely mixed ethylenically unsaturated The term "alkyd resin" includes modified alkyd resins.

It is to be understood that variations and modifications of the specific products and processes herein shown and described for purposes of illustration may be made without departing from the spirit of the invention.

What I claim is:

1. In a coating composition comprising a pigmented aqueous dispersion of a film-forming material selected from the group consisting of polymers of ethylenically unsaturated monomers, alkyd resins, ester gum, and rosin, the improvement which comprises .5 to 15% by weight, based on the weight of inorganic pigments present in said dispersion, of a water-soluble Werner complex of chromium and an organic monocarboxylic acid having a hydrocarbon group of at least two carbon atoms connected to a carbovyl group, whereby upon drying of the coating deposited from said aqueous dispersion and heating of the dried film at elevated temperatures, surface portions of the pigment are hydrophobic by reaction with said treating material to attach the said organic groups to the surface thereof, and improved compatibility with the film-forming material occurs.

2. A product according to claim 1 wherein a Werner chromium complex having at least ten carbon atoms is present in said coating composition.

3. An article comprising a base member and a dried coating deposited from the product of claim 1.

No references cited.